Feb. 6, 1934.  C. B. CHRISTIANSEN  1,946,390
PORTABLE SAWING MECHANISM AND METHOD OF USE
Filed July 16, 1932  5 Sheets-Sheet 1

INVENTOR
C. B. Christiansen
BY Morrison, Kennedy & Campbell
ATTORNEYS.

Feb. 6, 1934.  C. B. CHRISTIANSEN  1,946,390
PORTABLE SAWING MECHANISM AND METHOD OF USE
Filed July 16, 1932  5 Sheets-Sheet 3

INVENTOR
C. B. Christiansen
BY
Morrison, Kennedy & Campbell
ATTORNEYS.

Feb. 6, 1934. C. B. CHRISTIANSEN 1,946,390
PORTABLE SAWING MECHANISM AND METHOD OF USE
Filed July 16, 1932 5 Sheets-Sheet 4
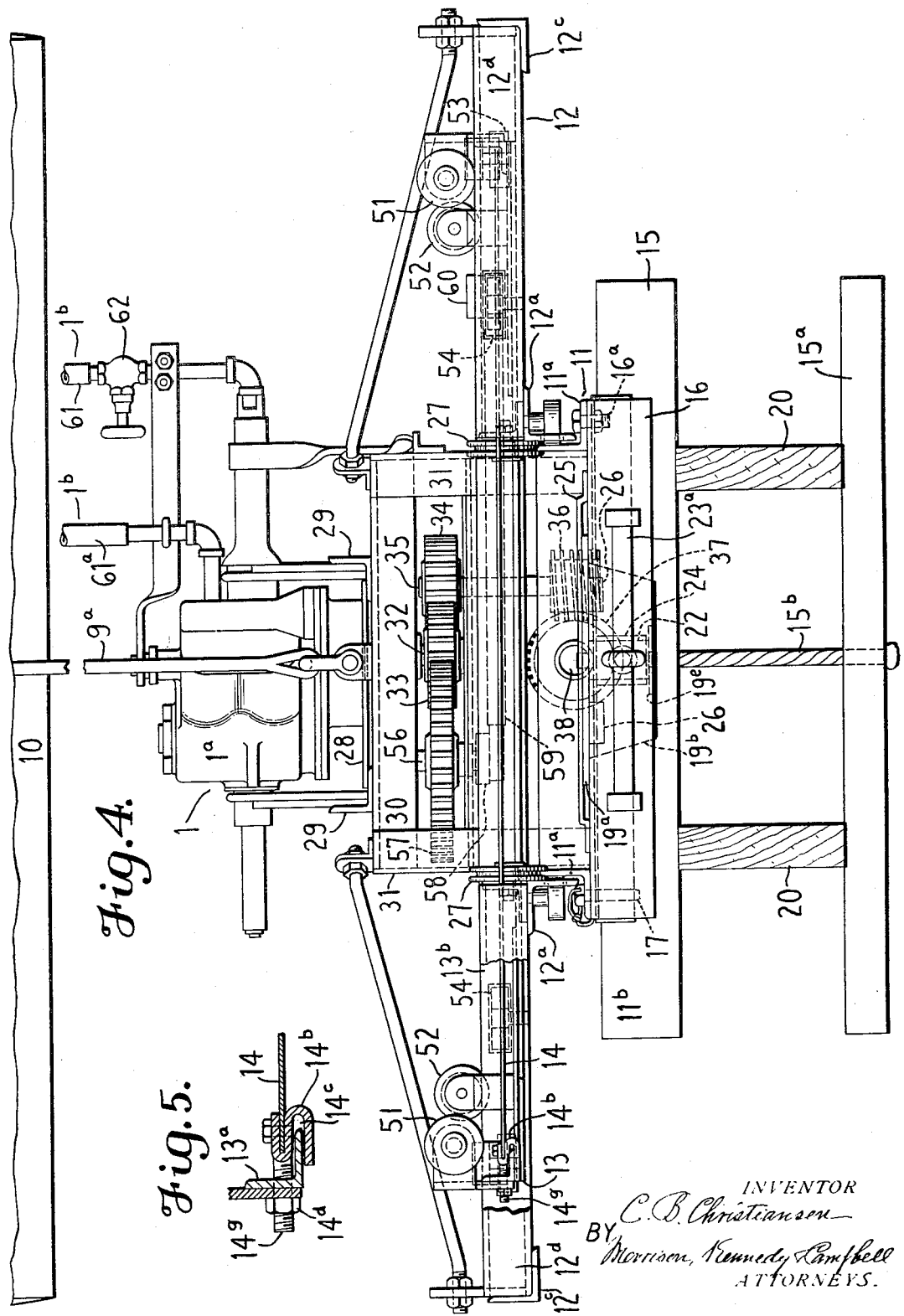
INVENTOR
C. B. Christiansen
BY Morrison, Kennedy, Campbell
ATTORNEYS.

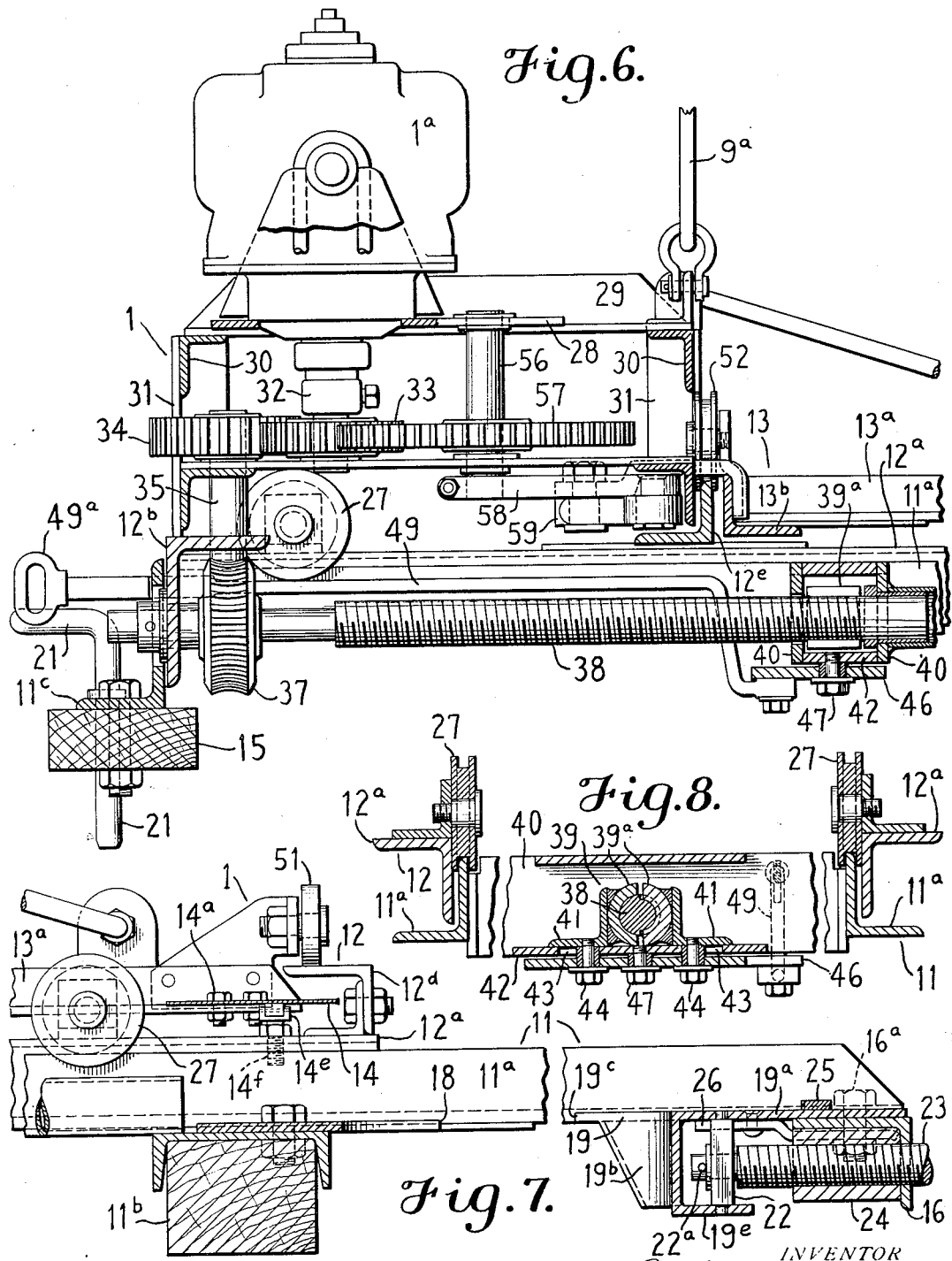

Patented Feb. 6, 1934

1,946,390

UNITED STATES PATENT OFFICE 1,946,390

PORTABLE SAWING MECHANISM AND METHOD OF USE

Christian B. Christiansen, Brooklyn, N. Y., assignor to Merritt-Chapman and Scott Corporation, a corporation of Delaware Application July 16, 1932. Serial No. 622,912

10 Claims. (Cl. 143—68)

This invention relates to a power-operated sawing machine and the method involved in the use of the same, designed more particularly for operating under water in the building of submerged structures, although not necessarily confined to under-water operation.

In one use of the mechanism in the building for instance of supports for under-water pipe lines, two rows of submerged piles are cut off by said mechanism near their upper ends at a common level, to permit of the fastening thereto of cap or cross-beams, which bridging the opposing piles of the two rows, constitute conjointly a cradle or support on which the pipe line is laid.

The invention, applicable among other uses to this particular use, consists of a portable power-operated sawing mechanism and the improved method involved in the use of the same under water, the said mechanism comprising a suitable portable frame supporting the operative parts and adapted to be lowered to the submerged piles, means on said frame to clamp it temporarily in fixed relation to the pile to be severed, a saw mounted on said frame for operation, and a source of power operatively connected to the saw to operate the same.

In the specification to follow, the invention will be described in detail, and the novel features thereof will be pointed out in the appended claims.

In the accompanying drawings:

Fig. 4 is a front elevation of the same;

Fig. 5 is a cross section of a detail on the line 5—5 of Fig. 3;

Fig. 6 is a longitudinal sectional elevation on the line 6—6 of Fig. 3, on a relatively larger scale than that of Fig. 3;

Fig. 7 is a similar view (broken) on the line 7—7 of Fig. 3; and

Fig. 8 is a cross section on the line 8—8 of Fig. 3.

Figure 1:
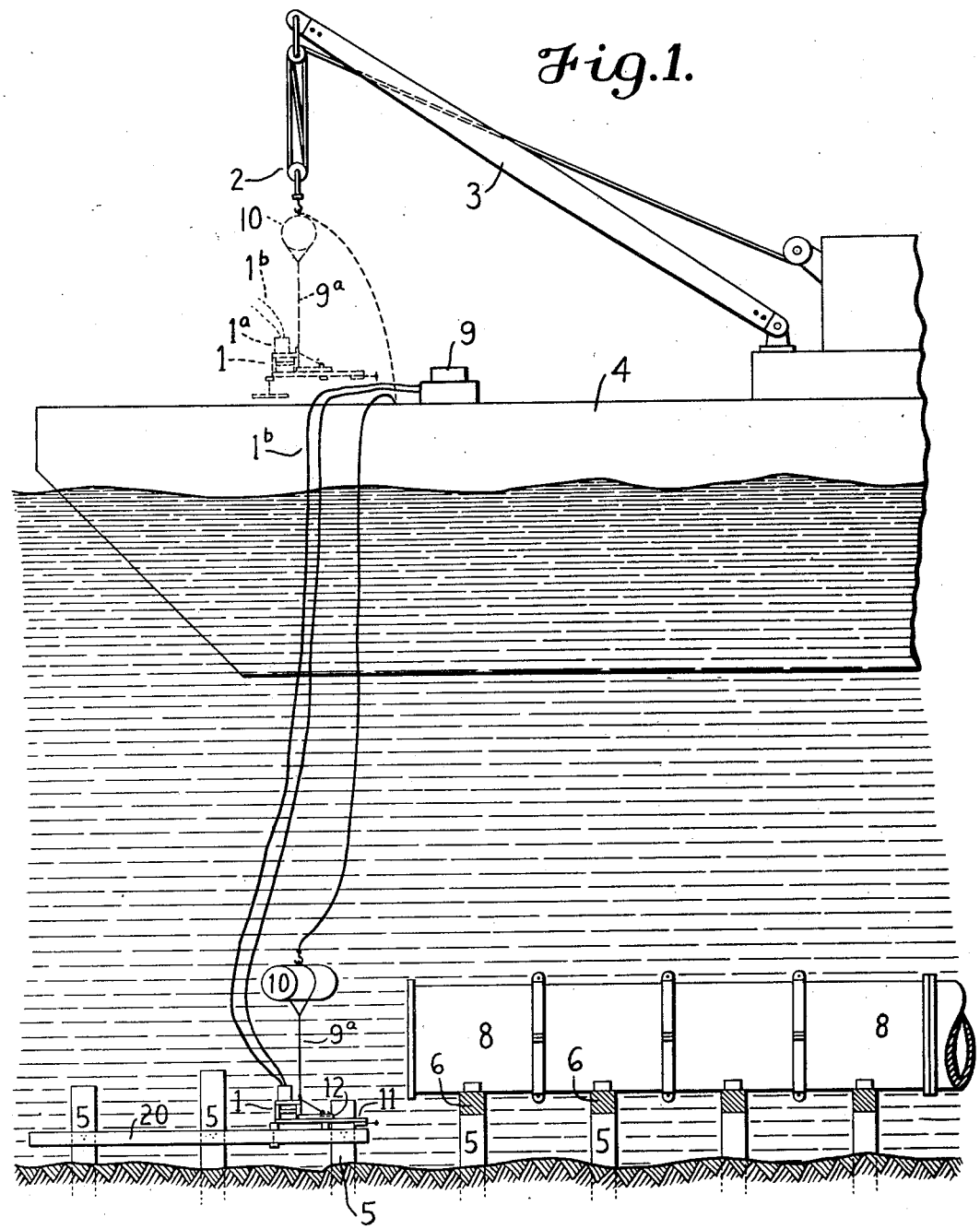
Fig. 1 is a diagrammatic view showing how the improved mechanism is lowered into the water from a float or scow and positioned relative to a submerged pile to saw the same.

Referring to the drawings:

Fig. 1 of the drawings shows diagrammatically how the improved sawing mechanism 1 is suspended by block and tackle 2 from a derrick boom 3 supported on a float or scow 4, so that the sawing mechanism can be lowered into the water to the submerged piles 5, whose upper ends are to be sawed off, and then positioned in proper relation to the piles for the sawing operation, the purpose being to prepare the upper ends of the piles to have fastened thereto, cap beams 6 adapted to form a cradle or support for the pipe line 8.

The sawing mechanism unit which will presently be described in detail, carries a fluid pressure-operated motor $1^a$ for operating the same, which motor is operatively connected by flexible pipe lines $1^b$ with a source 9 of pressure fluid, preferably air under pressure, supported on the float 4; and the weight of the unit in the water is buoyed by an air-tight tank or float 10 connected to the unit by a cable $9^a$ as shown in Fig. 6, to facilitate the handling of the unit beneath the water by divers in positioning the same in proper relation to the successive piles which are to be severed.

This sawing mechanism unit comprises as its main element, a rectangular portable open base frame 11, a saw feeding carriage 12 movable longitudinally on the base frame to feed the saw as it cuts into the pile, a saw reciprocating frame 13 carried by the carriage 12 and reciprocable thereon laterally, and a cross-cut saw 14 carried by the frame 13 to be reciprocated thereby in performing its sawing operation.

The base frame 11 consists in the present instance, of two fore-and-aft extending side angle bars $11^a$, a cross beam $11^b$ fixed to and connecting said bars together in spaced relations at a point midway of the length, a rear cross angle bar $11^c$ connected to the rear ends of the bars $11^a$ and maintaining said ends in spaced relations, and fixed to the upper side of a rear cross beam 15, and a front cross angle bar 16.

This front angle bar 16 is pivoted at one end as at $16^a$ to the horizontal flange of one of the side bars $11^a$ at its front, and is releasably fastened at its opposite end to the horizontal flange of the other side bar at its front by means of a removable fastening pin 17 passing through alined holes in the end of the bar 16 and the flange of the bar $11^a$. Due to this construction, the said bar 16 can be swung aside, after releasing the fastening pin 17, and thus open the front end of the rectangular frame, in order that the frame may be positioned on the submerged pile for sawing the same.

Figure 3:
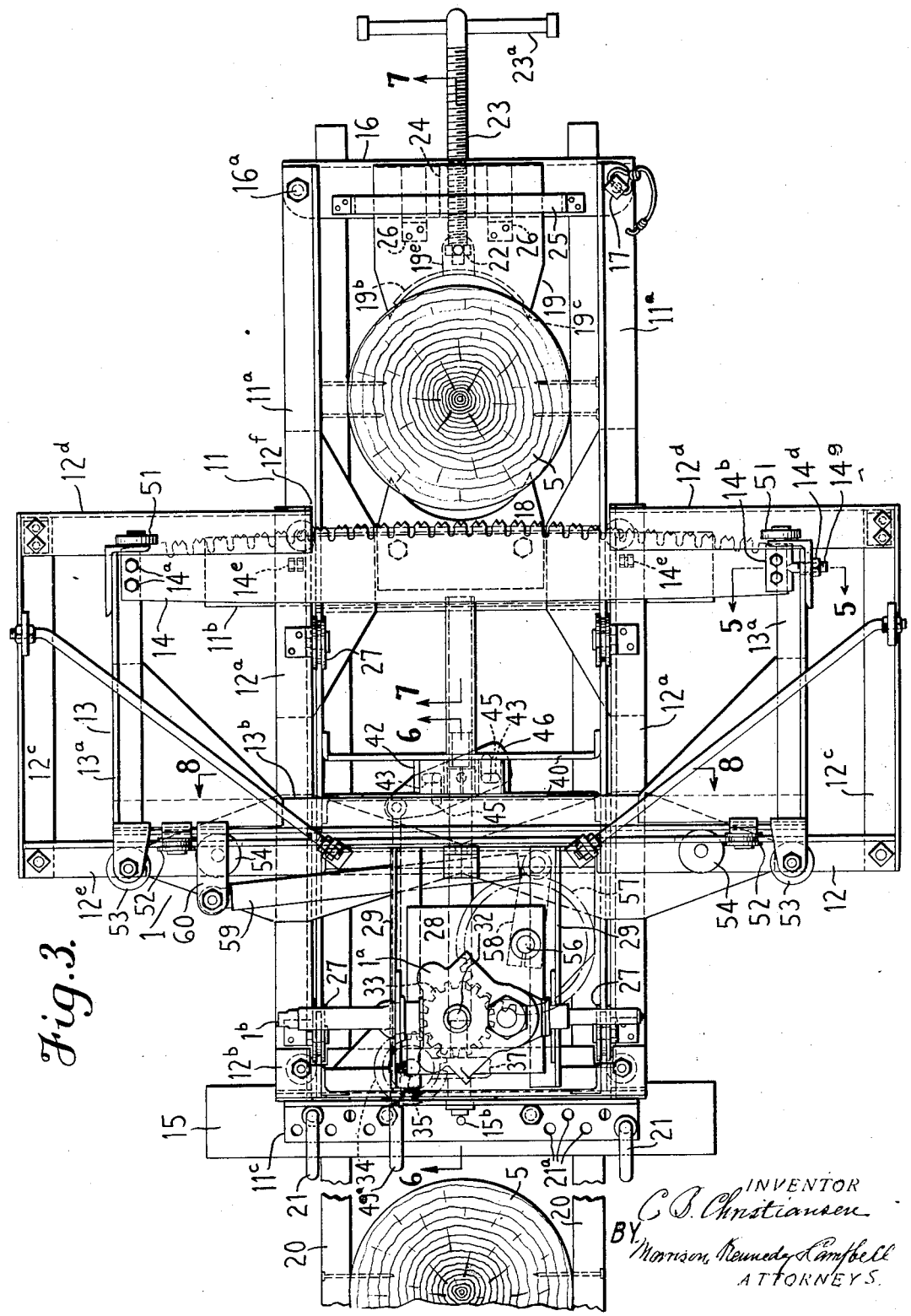
Fig. 3 is a top plan view of the parts shown in Fig. 2.

When so positioned, the rectangular frame is clamped to the pile through the medium of a rear clamping jaw 18 fixed to the cross beam $11^b$ and engaging the rear side of the pile, and a front clamping jaw 19 carried by the pivoted cross bar 16 and engaging the front side of the pile when said cross bar is fastened in position across the front open end of the rectangular frame, as shown in Fig. 3.

Figure 2:
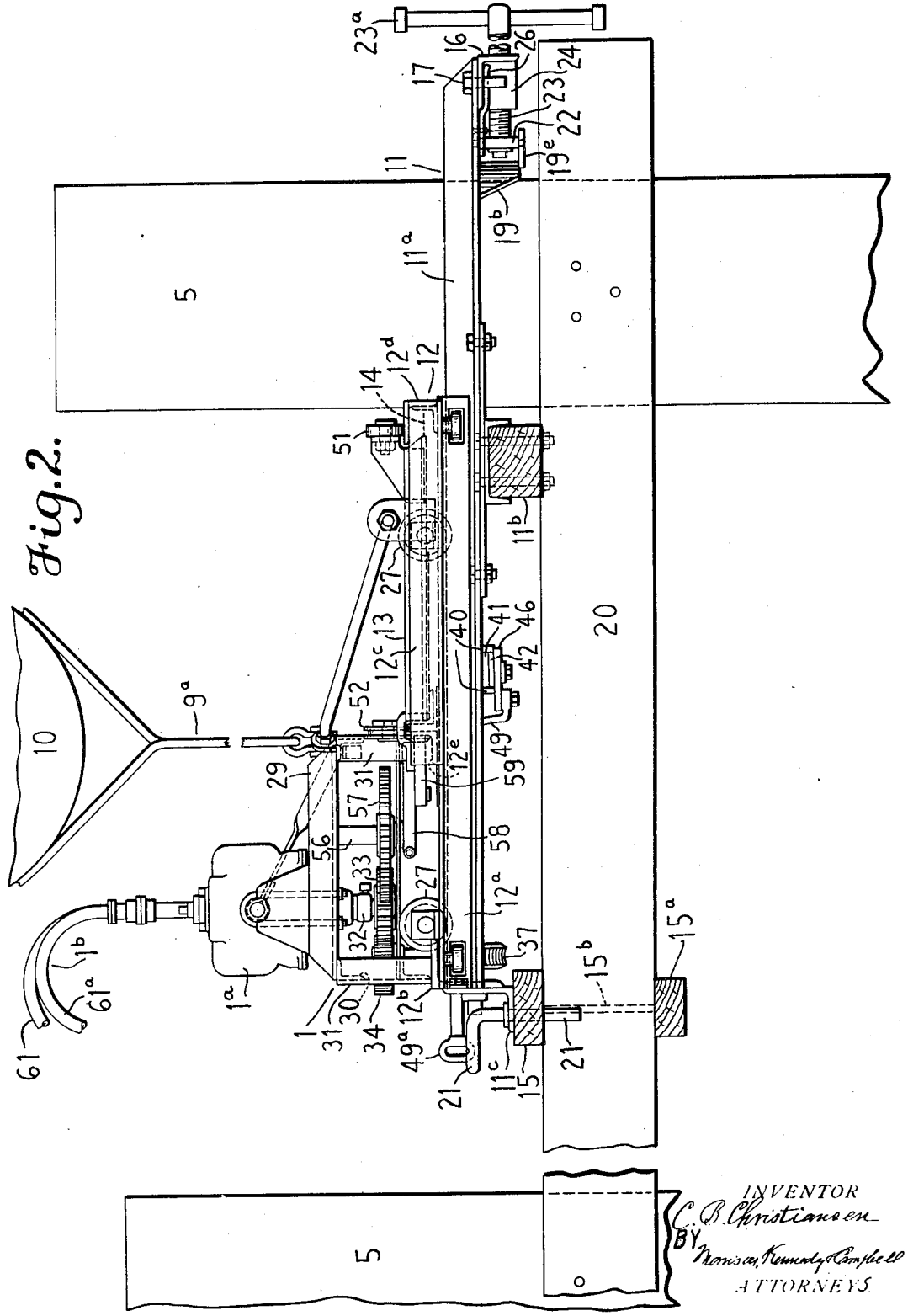
Fig. 2 is a side elevation of the sawing mechanism on an enlarged scale, the same being shown clamped to a submerged pile, ready for the sawing operation.

With the base frame thus clamped near its forward end to a pile, the rear portion of the frame is supported in horizontal position between the clamped pile and the adjacent pile, by means of horizontal battens 20 which are fastened temporarily, as shown in Figs. 1, 2 and 3, to the opposite sides of several of the piles in the row adjacent the one being operated on, the cross beams 11$^b$ and 15 of the base frame bridging and resting upon said battens, and thereby, in connection with the clamping jaws, supporting the base frame solidly in horizontal position for the sawing operation.

The base frame when thus supported, is prevented from lateral movement or displacement by means of vertical stop pins 21, best shown in Fig. 3, which extend downwardly loosely and removably through vertical holes 21$^a$ in the rear beam 15, with the lower ends of the pins disposed at the opposite sides of the two battens, thereby serving as stops to prevent the lateral displacement of the frame. There are a number of these holes 21$^a$ spaced at intervals lengthwise of the beam in order to provide for the different spacing of the battens for piles of different cross-sectional areas.

The base frame is held down at its rear on the battens by means of a locking bar 15$^a$, which, as shown in Fig. 4, is connected midway between its ends to the lower end of a rope 15$^b$, whose upper end is connected with the cross bar 15. This locking bar is of a length to bridge the space between the battens and to extend at its ends beyond the same, so that in this position it will act to hold the base frame down on the battens. The base frame may be released by turning the bar 15$^a$ around, so that it will extend free of the battens in line with and between the same.

The front pile clamping jaw 19 comprises an upper horizontal flat plate 19$^a$, whose rear edge is curved inwardly or concaved, so as to approximately fit around the forward side of the pile, the rear end corners of said plate presenting engaging points 19$^c$ adapted to bite into the pile and thus secure a firm engagement therewith. A vertical inwardly curved bracing plate 19$^b$ depends from the curved edge of the plate 19$^a$, and at its lower end at its center the plate 19$^b$ is extended forwardly in the form of a foot 19$^e$, as shown in Fig. 7. Vertically alined bearing holes are formed in this foot and in the horizontal plate 19$^a$ above it, in which holes are loosely mounted, studs on the upper and lower ends respectively of a vertical block 22, whereby the jaw 19 is capable of a rocking movement relative to the block on a vertical axis, to enable the curved edge of the jaw to accommodate itself to varying contours of piles.

The jaw 19 is moved horizontally relative to the cross bar 16 to and from the fixed jaw 18 by means of a feed screw 23 threaded through a nut 24 fixed to the underside of the cross bar 16, the said feed screw having its rear end extending loosely through and pinned to the vertical block 22, as at 22$^a$, and the said screw being provided at its forward end with a handle 23$^a$ for turning it. In the horizontal movements imparted to the jaw by the feed screw, the jaw is guided by the plate 19$^a$ thereof sliding beneath a strap 25 fixed to and spaced a short distance above the upper side of the bar 16; and the jaw is further guided and steadied in its movements by means of two horizontal fingers 26 fixed to the underside of the plate 19$^a$, and having their forward ends spaced therefrom to underlie the upper horizontal plate of the bar 16, as best shown in Figs. 3 and 7.

Due to this manner of mounting and operating the clamping jaw 19, the latter is capable of a lateral rocking or tipping movement relative to the base frame, but will be guided in a truly horizontal direction, whereby the jaw will be enabled to engage the pile firmly, without regard to the varying contours of different piles, and the frame will be held rigidly and effectively on the pile during the sawing operation.

The fixed clamping jaw 18 consists, as shown in Figs. 3 and 7, of a flat horizontal plate having its front edge curved inwardly to receive the rear side of the pile, and bolted fixedly to the upper side of the cross beam 11$^b$ at its center.

In positioning the frame for a sawing operation, the front cross bar 16 is first swung outwardly on its pivotal axis 16$^a$ to open the front end of the frame, and carries with it the movable clamping jaw, and the base frame is shifted horizontally, after being seated on the battens, to enter the pile which is to be sawed between the front ends of the side frame bars 11, the rear clamping jaw in this action being brought into engagement with the rear side of the pile. The front cross bar 16 is then swung to closed position and secured by the pin 17, and the stop pins 21 at the rear end of the base frame are positioned at the outer sides respectively of the two battens to confine the rear end of the base frame against lateral displacement; and finally the jaw operating feed screw 23 is turned up to engage the front jaw tightly with the pile and thereby clamp the frame firmly to the same.

The saw feeding carriage 12 before alluded to, is mounted on and movable longitudinally of the base frame 11, and consists of an open framework made up of angle bars fastened together into a unitary flat rigid frame structure. This frame comprises two fore-and-aft extending inner side-frame bars 12$^a$ firmly connected together at their rear ends by a rear cross bar 12$^b$, two outer side-frame bars 12$^c$ extending parallel with the inner frame bars, and connected at their front ends respectively to the front ends of the inner frame bars by cross bars 12$^d$, the said outer bars 12$^c$ terminating at their rear ends short of the rear ends of the bars 12$^a$, and being connected together at their rear ends by a long transversely extending frame bar 12$^e$ which intersects the two inner bars 12$^a$, and is fastened thereto at the points of intersection.

As a result of this construction of the carriage frame, it presents at its front end an open central portion 12$^f$, bounded at its sides by the inner side bars 12$^a$, and at its rear by the cross bar 12$^e$, and open at its front between the two cross bars 12$^d$, the purpose of which particular construction will presently appear.

The carriage 12 thus formed is supported for traveling movement on the base frame longitudinally thereof, through the medium of vertical supporting rollers 27 journalled on the inner sides of the two bars 12$^a$ of the carriage at their front and rear, and grooved to receive the vertical flanges of the respective side bars 11$^a$ of the base frame. At its rear end, the saw feeding carriage 12 gives support to the fluid pressure motor 1$^a$, before alluded to, which motor, as shown in Figs. 2, 3 and 6, is fastened down on a horizontal supporting plate 28, which in turn is fastened at its side edges to two fore-and-aft extending bars 29 supported at their front and rear ends respectively by two transversely extending bars 30 fixed to the upper ends of posts 31 rising from the rear portion of the saw feeding carriage at the points of intersection of the bar 12$^e$ with the bars 12$^a$, and at the junction of the latter bars with the rear cross bar 12$^b$.

The motor shaft 32 extends downwardly beneath the supporting plate 28 and has fixed to it near its lower end, a horizontal driving pinion 33 meshing with a horizontal pinion 34 on the upper end of a vertical shaft 35 mounted in bearings on the saw feeding frame. At its lower end, the shaft 35 carries a worm 36 engaging a worm wheel 37 fixed to a fore-and-aft extending carriage feed screw 38 near its rear end, the said screw being journalled at its rear extremity in a bearing on the rear cross bar 12$^b$ of the saw feeding carriage, and being threaded through a nut 39 supported between two bars 40 extending transversely of and connected at their ends to the side bars 11$^a$ of the base frame 11.

The form and relation of the gearing and carriage feed screw 38 just described, are such that in the rotation of the motor shaft on the admission to the motor of the pressure fluid, the feed screw will be turned in a direction which, in cooperation with the nut 39, will move the saw feeding carriage and the parts carried thereby, forwardly at a uniform and slow rate of feed, thereby feeding the saw 14 carried by the feeding carriage into the pile, as the saw is reciprocated on the carriage in effecting the sawing operation, as will be presently more fully described.

After the pile has been completely severed by the saw, it will be necessary to retract the saw feeding carriage in order to bring the saw back for another sawing operation on another pile, and this I accomplish by constructing the nut 39 of two separable half sections 39$^a$ (see Figs. 6 and 8), which are normally held together in operative relation in engagement with the threads of the feed screw, but which may, at will, be separated to release the screw to permit the latter to be retracted to its former position.

To admit of this operation of the parts, the nut sections 39$^a$ are carred by bracket plates 41, 41 respectively, which are seated to move to and from each other on a horizontal plate 42 fixed between the transverse bars 40 before alluded to. The plate 42 is formed with two transversely extending slots 43, in which slide vertical rollerpins 44 extending downwardly from the bracket plates 41 and through fore-and-aft extending slots 45 in a horizontal plate 46, pivoted between its ends as at 47 to the underside of the fixed plate 42.

The form and relative arrangements of these parts are such that, with the rocking plate 46 in the angular position shown in Fig. 3, the pins 44 will be at the inner ends of the slots 43 in the fixed plate 42, and will be respectively at the front and rear ends of the slots 45 in the rocking plate 46, so that when the plate 46 is rocked to the opposite angle, the movement of the slots 45 through the arcs, will act to push the pins 44 outwardly from each other in the slots 43, thereby moving the two bracket plates outwardly away from each other and separating the nut sections so as to disengage the same from the feeding screw. The saw feeding carriage together with the feed screw, can then be retracted by hand.

The rocking plate 46 is actuated by means of a rod 49, pivoted at its forward end to one end of the plate 46 and extending thence rearwardly through a vertical key-hole slot in the rear transverse bar 11$^c$ of the base frame, the rod 49 being provided on its rear end with a handle 49$^a$ for operating it, and being formed in its opposite sides with opposed cavities adapted to receive the walls of the reduced lower portion of the keyhole slot. In this way, the rocking plate may be locked in position to hold the split nut engaged with the feed screw, and may be operated as above described to release the screw, by lifting the operating rod upwardly into the enlarged portion of the key-hole slot, and then shifting the rod endwise.

The saw reciprocating frame 13 before alluded to, is mounted to reciprocate transversely on the saw feeding carriage 12, and comprises, as shown best in Fig. 3, a horizontal flat frame structure made up of two fore-and-aft extending side angle bars 13$^a$ connected rigidly together at their rear ends in spaced relations by a transverse angle bar 13$^b$, thereby leaving the front of the frame open between the side bars 13$^a$.

The cross-cut saw 14, before alluded to, extends across this open front of the frame, and is bolted at one end as at 14$^a$, to the horizontal flange of the bar 13$^a$ at that side, and has fixed to its other end a bracket plate 14$^b$ (see Fig. 5) having a horizontal slat 14$^c$ to receive the horizontal flange of the other frame bar 13$^a$, and having also a threaded stem 14$^g$ which extends through a hole in the vertical flange of the bar 13$^a$, and has screwed on its outer end a nut 14$^d$ to confine the parts and apply the necessary tension to the saw blade.

The saw blade between its points of attachment to the two side bars 13$^a$ of the saw reciprocating frame, is supported so that it will reciprocate in a true horizontal plane, by means of two rollers 14$^e$, which are journalled, as shown in Fig. 7, on horizontal fore-and-aft axes in the upper ends of stems 14$^f$ threaded in the respective side bars 12$^a$ of the saw feeding carriage with the rollers supported on the top sides of the frame bars, the rollers being thus adjustable vertically to compensate for any unevenness or changing conditions in the plane of action of the saw blade.

The saw reciprocating frame 13 thus formed, is supported for reciprocating movement on the saw feeding carriage, by suitable vertical supporting rollers 51, 51, journalled on the front ends of the respective frame bars 13$^a$, and traveling on the respective transverse bars 12$^d$ of the saw feeding carriage, whereby the saw reciprocating frame is supported at its front. At its rear, the frame is supported by vertical rollers 52, 52 journalled on the rear frame bar 13$^b$ and traveling on the long transverse frame bar 12$^e$ of the saw feeding carriage. The saw reciprocating frame is further supported and guided in its reciprocating movements by means of two horizontal rollers 53, 53 journalled respectively on the rear corners of the frame and traveling on the vertical flange of the transverse bar 12$^e$ of the frame saw feeding carriage 12; and is also guided by two horizontal rollers 54 journalled on the rear bar 12$^e$ of the saw feeding carriage and bearing against the vertical flange of the rear bar 13$^b$ of the saw reciprocating frame, it being these two rollers 54 which serve to transmit to the saw reciprocating frame its forward feeding movement resulting from the longitudinal feed of the feeding carriage by the feed screw as hereinbefore described.

The saw reciprocating frame is given its reciprocating movements by means of the motor 1ª, before referred to, and for this purpose there is journalled in the rear portion of the saw feeding carriage, a vertical shaft 56 having fixed to it near its lower end, a pinion 57 in mesh with the pinion 33 on the motor shaft. At its lower end, the shaft 56 has fixed to it a crank arm 58 which is pivoted at its free end to the inner end of a horizontal transversely extending link 59, whose opposite end is pivoted to an arm 60 fixed to and extending rearwardly from the rear end of the saw reciprocating frame. By these means, the saw reciprocating frame, and the cross-cut saw at its front, are reciprocated by the motor to perform the sawing operation, and at the same time, due to the drive of the saw feeding carriage by the motor, the said carriage, and consequently the saw supported thereby through the medium of the saw reciprocating frame, is advanced slowly so as to feed the saw more deeply into the wood as the sawing operation progresses.

It will be noted on reference to Figs. 3 and 7, that the teeth of the saw are only exposed where the saw spans the space between the two side frame bars 11ª of the base frame, the saw beyond these side bars being shielded by means of the vertical flanges of the two front transverse frame bars 12ᵈ of the saw feeding carriage. This arrangement avoids any danger of the divers working in the vicinity of the sawing mechanism, and in manipulating or positioning the same, from being injured by the saw, since the teeth are entirely isolated from outside interference, by the side frame bars 11ª of the base frame, and by the transverse frame bars 12ᵈ of the saw feeding frame.

In using the sawing mechanism, it will be lowered into the water and positioned by divers on the pile to be sawed and on the battens previously applied to the piles, and after being clamped in place for a sawing operation, the pressure fluid from the pressure fluid source will be admitted to the motor through the supply pipe 61 of the pipe line before alluded to, which supply pipe is provided with a cut-off valve 62 adjacent the motor, and adapted to be operated by divers working at that point; and the exhaust from the motor will pass upwardly through the other pipe 61ª of the pipe line. The motor in its operation will reciprocate the saw to perform the sawing operation on the pile, and at the same time will feed the saw bodily at right angles to its line of reciprocation, so as to cause the saw to bite more deeply into the wood as the sawing operation progresses. When the sawing of the pile is completed, the pressure fluid will be cut off from the motor, the split nut will be released to permit the saw to be retracted, and the base frame will be unclamped from the pile and unfastened from the battens, whereupon the frame may be shifted on the battens and clamped to the next pile to be sawed, and the foregoing operations will be repeated to saw off the upper ends of the piles.

It will be understood that after the mechanism has been lowered for clamping to the piles, the tackle 2 will be uncoupled and raised to the surface, and the sawing mechanism will be left submerged until the work has been completed, whereupon the tackle will be again lowered and coupled to the sawing mechanism, so that it may be lifted to the surface.

The manipulation of the mechanism in its submerged condition, and the positioning of the same in sawing relation to a pile, and the release of the mechanism therefrom and its re-positioning on other piles to be sawed, is, it will be understood, effected by divers working at the point of operations, the buoyant body 10 which is attached to the mechanism, as hereinbefore referred to, serving to counteract the weight of the very heavy structure in the water, and enabling the same to be moved about by the divers in the positioning and re-positioning of the same, with great ease and facility.

The provision of this attached buoyant body for thus counteracting the weight of the heavy sawing mechanism in the water, I consider is of further advantage, in that it will not be necessary to keep the mechanism attached to the hoisting tackle while the operation of sawing off the successive piles is in progress, it being but necessary to lower the sawing mechanism to the point where the work is to be conducted, and then detach it from the hoisting tackle and leave the mechanism where it will be taken care of and moved about for its work by the divers as referred to.

In the foregoing description and accompanying drawings, the invention has been set forth in the particular detailed form and construction of the parts which in practice have been found to answer to a satisfactory degree the ends to be attained. It will be understood, however, that these details may be variously changed and modified by the skilled mechanic, without departing from the limits of the invention; and further, it will be understood that the invention is not limited to any particular form or construction or arrangement of the parts, except insofar as such limitations are specified in the claims.

Having thus described my invention, what I claim is:

1. In mechanism for sawing off parts, the combination of a portable frame having at one end two frame bars adapted to extend respectively on opposite sides of the part to be sawed, a saw mounted on said frame for operation, a clamping jaw on the frame in position to engage one side of the part to be sawed, a second clamping jaw supported by and extending across the ends of the frame bars and adapted to be operated to clamp against the opposite side of the said part, said second jaw being mounted on a fixed pivot and movable bodily from across the ends of the frame bars to permit of the positioning of the frame in sawing relation to the part to be sawed and being movable toward and away from the first mentioned jaw for stamping the part to be sawed between said two jaws, and controllable power means for operating the saw.

2. The combination of elements set forth in claim 1, characterized by the fact that the second clamping jaw is mounted for clamping movement on a cross bar pivoted at one end to the end of one of the frame bars, and that means are provided for fastening the opposite end of the cross bar releasably to the end of the other frame bar.

3. In mechanism for sawing off parts, the combination of a portable frame having at its front two frame bars adapted to extend respectively on opposite sides of the part to be sawed, a saw mounted on said frame for operation, a rear clamping jaw fixed on the frame in position to engage one side of the part to be sawed, a front clamping jaw supported by and extending across the forward ends of the two frame bars and movable toward the fixed jaw to clamp against the opposite side of the part to be sawed, said front jaw being mounted on a fixed pivot and movable also bodily from across the ends of the frame bars to permit of the positioning of the frame with the frame bars extending on opposite sides of the part to be sawed, and controllable power means for operating the same.

4. The combination of elements set forth in claim 3, characterized by the fact that the clamping movement of the front clamping jaw is effected by a feed screw threaded in the cross bar and operatively connected with the jaw.

5. In mechanism for sawing off submerged piles having horizontal battens fastened temporarily thereto to support the sawing mechanism, the combination of a portable frame adapted to be lowered into the water to the piles to be sawed, a saw mounted on said frame, controllable power means for effecting the cutting operation of the saw, said cutting operation including actuation of the saw and a feeding movement thereof relative to said frame, clamping means adjacent one end of the frame for clamping the same releasably to the pile to be sawed, with the portable frame supported in horizontal position on the battens, and means on the portable frame for releasably holding the same down on the battens.

6. In mechanism for sawing off submerged piles having horizontal battens temporarily fastened thereto to support the sawing mechanism, the combination of a portable frame adapted to be lowered into the water to the piles to be sawed, a saw mounted on said frame, controllable power means for effecting the cutting operation of the saw, said cutting operation including actuation of the saw and a feeding movement thereof relative to said frame, means on the frame for clamping the same at one end to the pile to be sawed, with the frame supported in horizontal position on said battens, and means on the portable frame cooperative with the battens to prevent lateral displacemnt of the frame thereon.

7. The combination of elements set forth in claim 5, characterized by the fact that the releasable means for holding the portable frame down on the battens is in the form of a horizontal locking bar sustained by the portable frame and movable to transverse position relative to the battens to extend across and engage the undersides of the same to hold the frame down on the battens, and movable also to a position longitudinally of the battens to disengage the same and thereby release the portable frame.

8. The combination of elements set forth in claim 6, characterized by the fact that the means on the frame to prevent lateral displacement on the battens, is in the form of stop pins insertable removably in vertical holes in the portable frame and adapted at their lower ends to extend at the sides of the battens.

9. In mechanism for sawing off parts, the combination of a portable frame, a saw mounted thereon and being movable in one direction for effecting its sawing action and being carried by a frame movable in another direction for effecting a feeding action, controllable power means for effecting said saw and saw carrying frame movements, clamping jaws on said portable frame to clamp against the opposite sides of the part to be sawed so as to hold the sawing mechanism in sawing relation thereto, one of said jaws comprising a horizontal flat plate curved inwardly at its rear edge to fit around said part, and guided horizontally on the frame, a bracing plate depending from the curved edge of the horizontal plate and provided with a foot portion, a vertical block journalled in the foot portion and overlying the horizontal plate to rock on a vertical axis, and a horizontal feed screw threaded in the portable frame and operatively connected with the vertical block.

10. In mechanism for sawing off submerged piles having horizontal battens fastened temporarily thereto to support the sawing mechanism, the combination of a portable frame adapted to be lowered into the water to the piles to be sawed, a saw mounted on said frame, controllable power means for effecting the cutting operation of the saw, clamping means adjacent one end of the frame for clamping the same releasably to the pile to be sawed with the portable frame supported in horizontal position on the battens, and means on the portable frame for releasably holding the same down on the battens, said saw having a reciprocable cutting action and a feeding movement at right angles thereto, and said controllable power means being adapted to effect both the cutting action and the feeding movement of the saw.

CHRISTIAN B. CHRISTIANSEN.